July 29, 1969     H. A. KIPP     3,458,380

METHOD OF BONDING THERMOPLASTICS

Filed Aug. 26, 1965

INVENTOR
HENRY A. KIPP

BY *James C. Orventes*

ATTORNEY

United States Patent Office 3,458,380
Patented July 29, 1969

3,458,380
METHOD OF BONDING THERMOPLASTICS
Henry A. Kipp, Somerville, N.J., assignor to Union
Carbide Corporation, a corporation of New York
Filed Aug. 26, 1965, Ser. No. 482,780
Int. Cl. B32b 3/02, 31/26
U.S. Cl. 156—306          4 Claims

ABSTRACT OF THE DISCLOSURE

This invention relates to a method of bonding a flat, thermoplastic member to a second thermoplastic member which has projections on its surface by placing the flat thermoplastic member on the projections of the second thermoplastic member and thereafter applying heat to the outer surface of the flat, thermoplastic member while maintaining the members in surface contact. Heat is transmitted from the flat member to the projections of the second member with the result that the projections melt and flow into the voids which existed between the projections.

---

This invention relates to fusion bonding of thermoplastics. More particularly, this invention relates to fusion, by means of heat, of thermoplastic members, one to another.

In the past, bonding of members of thermoplastic material to form a unitary structure, having a thickness of approximately the combined thickness of the thermoplastic members, has been effected by placing the members, one on top of the other, and then pressing the members together while applying heat from an external source. Heat is applied until at least one of the surfaces, in mutual contact, reaches its fusion temperature with the result that this surface becomes soft and tacky. The thermoplastic members are then allowed to cool to a unitary structure in which the members are bonded together at their contacting surfaces.

As an illustration of one method of bonding together thermoplastic sheets to form a unitary structure, as described in the preceding paragraph, heat is applied to the thermoplastic sheets by a heated plate which is pressed down upon the upper sheet. Heat is transmitted by conduction from the heated plate through the upper sheet to the lower sheet.

In this and in other comparable methods, it has been found that it is necessary to apply heat to the thermoplastic sheets over a relatively long period of time in order that a strong bond be effected therebetween. Applying heat to the thermoplastic sheets over a relatively long period of time, causes thermal degradation of the thermoplastic sheet in direct contact with the heat source. Thermal degradation is evidenced by changes in color, and loss in physical strengths such as tensile strength, shear strength and the like.

It is an object of the present invention to provide for a method of bonding thermoplastic material, one to another, to form unitary structures which are free of the defects noted above.

It is a further object of the present invention to provide a method of bonding thermoplastic members, one to another, in a shorter period of time than has been possible heretofore.

Still other objects and advantages of the present invention are apparent from the following detailed description taken in conjunction with the accompanying drawings wherein.

Figure 1:
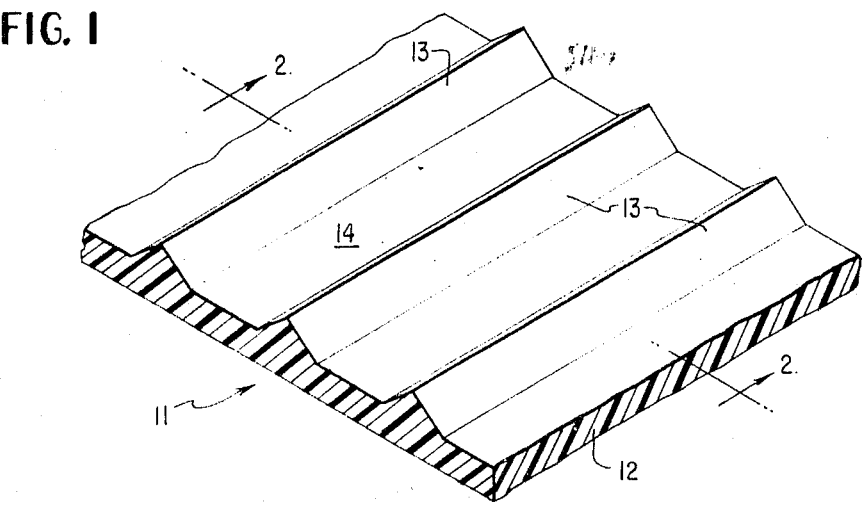
FIGURE 1 is a perspective view, partially in section, of a thermoplastic member, identified by numeral 11, which is employed in the present invention.
Figure 2:
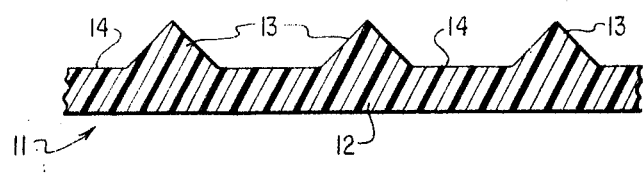
FIGURE 2 is a cross-sectional view taken along line 2—2 of FIGURE 1.
Figure 3:
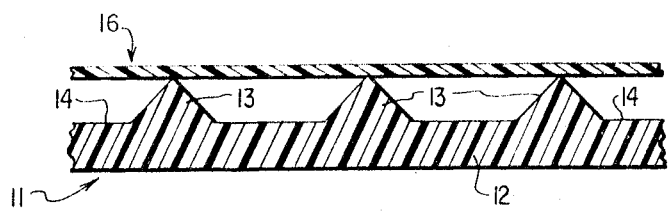
FIGURE 3 is a cross-sectional view of member 11 of FIGURE 1 and a cross-sectional view of thermoplastic member 16 in position to be bonded, one to another.
Figure 4:
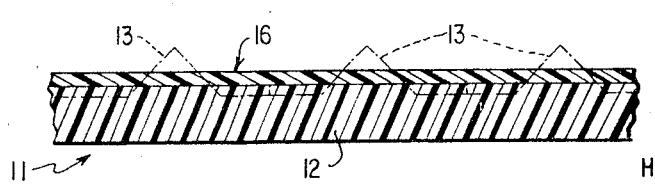
FIGURE 4 is a view of the thermoplastic members of FIGURE 3, after they have been bonded together.

Referring to the drawings and specifically referring to FIGURES 1 and 2 there is shown thermoplastic member 11 having a body 12 and having a plurality of projections 13 extending above surface 14 of body 12. In the embodiment which is shown in the drawings, projections 13 are in the form of triangular shaped ribs with the apex thereof extending above surface 14. As a general rule, the projections are of greater cross-sectional area at their base wherein they are in contact with surface 14 although the reverse can be true. Rather than ribs, as shown in the accompanying drawings, the projections can be needle like in form or of any other geometric shape, such as cones, cylinders and the like.

Projections can be provided over substantially the entire surface of the thermoplastic member which is to be bonded or if desired, over only preselected areas in regular and/or irregular fashion. By providing projections at only preselected areas, the unitary structure which is subsequently produced has strong bonds at the areas which had projections and weak bonds at the areas devoid of such projections.

Utilizing such an arrangement, as for example, in a "blister" package, that is a package, having a strong backing and a dome-like, contoured thermoplastic covering over the packaged goods, it is a simple matter to separate the covering from the backing at the areas of the weak bonds allowing access to the packaged goods while the strong bonds maintain the identity of the package.

Thermoplastic members, having projections thereon, can be produced by any one of several well-known processes as, for example, by extrusion wherein the projections are integral parts of the thermoplastic members; by the methods described in U.S. Patent 3,034,941 to W. H. Hessenthaler et al., issued May 15, 1962; by well known molding processes; or if desired, by simply positioning monofilaments and the like on the surfaces of the thermoplastic member.

The thermoplastic member, which is to be bonded to the member having the projections, generally has a thickness of less than about 50 mils and preferably less than about 30 mils. This thermoplastic member, identified by numeral 16 in the drawings, can be a single ply structure, as shown, or it can be a multi-ply structure.

As a rule, the members to be united are of the same thermoplastic material although the only requirement is that materials used can be heat bonded, one to another.

Illustrative of thermoplastics which can be utilized in accordance with the present invention are polyethylene, polypropylene, polystyrene, copolymer of ethylene and vinyl acetate and the like.

In carrying out the present invention, a thermoplastic member 16 is placed in contact with projections 13 of thermoplastic member 11 which rests on a suitable support (not shown). Direct heat, and when desired, pressure are applied to member 16 by any suitable means, as for example, a flat, heated plate (not shown). Heat is applied until projections 13 soften and flow in the voids which existed between projections.

The actual operating conditions, temperature, length of time of the heating cycle and when desired, pressure, will vary and depend, in part, upon the nature of the materials being heat bonded. The unitary structure which is formed is then allowed to cool to room temperature, about 25° C.

The following examples further illustrate the present invention and are not intended to limit the scope thereof in any manner.

In each of the examples noted below the procedure and materials were the following: a polyethylene member having a thickness of 18 mils and also having a plurality of integral ribs of triangular cross-sectional profile which projected upwardly 11 mils and were spaced 40 mils one from another, was placed on a supporting block and a polyethylene sheet 3 mils thick, placed flat on the projecting ribs. A heated plate, at a temperature of about 200° C., was pressed down on the polyethylene sheet until the projections softened and flowed. The unitary structure was then allowed to cool to room temperature. The strength of the bond was determined by manually grasping the edges of each member and pulling the members until a separation occurred. If the separation occurred at the interface of the thermoplastic members, the bond was rated as poor. If a rupture of one of the members occurred before a rupture of the bond, the bond was rated as excellent.

| | Rating |
|---|---|
| Example 1 | Excellent. |
| Example 2 | Do. |
| Example 3 | Do. |
| Example 4 | Do. |
| Example 5 | Do. |

Controls noted below were run in the same manner as Examples 1–5, with the exception that the 18 mil polyethylene member did not have any projections.

| | Rating |
|---|---|
| Control A | Poor. |
| Control B | Do. |
| Control C | Do. |
| Control D | Do. |
| Control E | Do. |

What is claimed is:
1. A method of bonding a flat, thermoplastic member to a second thermoplastic member which has projections on its surface which comprises placing said flat, thermoplastic member on the projections of the second thermoplastic member and thereafter applying heat only to the outer surface of said flat, thermoplastic member while maintaining said members in surface contact with the result that heat is transmitted from said flat member to the projections of said second member and said projections melt and flow into the voids which existed between said projection and thereafter allowing said members to cool to a unitary structure.

2. A method as defined in claim 3 wherein each of said members and projections are of polyethylene.

3. A method as defined in claim 1 wherein said flat, thermoplastic member has a thickness of less than about 50 mils.

4. A method as defined in claim 1 wherein said flat, thermoplastic member has a thickness of less than about 30 mils.

References Cited

UNITED STATES PATENTS

| 2,520,737 | 8/1950 | Romeyn et al. | 156—306 |
| 2,771,388 | 11/1956 | Rocky et al. | 154—102 |
| 2,800,856 | 7/1957 | Myers | 101—401.1 |
| 3,219,742 | 11/1965 | Reinert | 264—248 |

D. J. FRITSCH, Primary Examiner

EARL M. BERGERT, Assistant Examiner

U.S. Cl. X.R.

264—248

PO-1050
(5/69)

UNITED STATES PATENT OFFICE
CERTIFICATE OF CORRECTION

Patent No. 3,458,380      Dated July 29, 1969

Inventor(s) H. A. Kipp

It is certified that error appears in the above-identified patent and that said Letters Patent are hereby corrected as shown below:

Column 1, line 58; "material" should read -- materials --.

Claim 1, line 11; "projection" should read -- projections --.

Claim 2, line 1; "3" should read -- 1 --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents